(12) United States Patent
Reichow (10) Patent No.: US 6,362,439 B1
(45) Date of Patent: Mar. 26, 2002

(54) LOAD-CELL MOUNTING ASSEMBLY

(75) Inventor: Keith Reichow, Kent, WA (US)

(73) Assignee: Stress-Tek, Inc., Kent, WA (US)

( * ) Notice: Subject to any disclaimer, the term of this patent is extended or adjusted under 35 U.S.C. 154(b) by 0 days.

(21) Appl. No.: 09/557,080

(22) Filed: Apr. 21, 2000

(51) Int. Cl.$^7$ .......................... G01G 19/52; A47B 71/00
(52) U.S. Cl. ................................. 177/144; 177/DIG. 9; 5/600
(58) Field of Search ........................... 177/144, DIG. 9, 177/238, 239, 244, 229; 5/600

(56) References Cited

U.S. PATENT DOCUMENTS

| | | | | |
|---|---|---|---|---|
| 3,741,328 A | * | 6/1973 | Anderson et al. | 177/210 R |
| 4,540,057 A | * | 9/1985 | Freeman | 177/244 |
| 4,926,951 A | * | 5/1990 | Carruth et al. | 177/144 |
| 4,934,468 A | * | 6/1990 | Koerber, Sr. et al. | 177/144 |
| 4,974,692 A | * | 12/1990 | Carruth et al. | 177/144 |
| 5,183,126 A | * | 2/1993 | Kellenbach | 177/211 |
| 5,224,561 A | * | 7/1993 | Ahl | 177/163 |
| 5,801,339 A | * | 9/1998 | Boult | 177/261 |
| 5,831,221 A | * | 11/1998 | Geringer et al. | 177/144 |
| 5,859,390 A | * | 1/1999 | Stafford et al. | 177/144 |

* cited by examiner

*Primary Examiner*—Randy W. Gibson
(74) *Attorney, Agent, or Firm*—Perkins Coie LLP (57) ABSTRACT

A load-cell assembly usable with a frame assembly that supports a selected mass thereon. The frame assembly has first and second frames movable relative to each other. The load-cell assembly has a load-cell body attachable to the first frame and substantially stationary relative to the first frame. A stud is attached to the load-cell body and has an elongated free end portion extending away from the load-cell body. A receiver body is attachable to the second frame and is substantially stationary relative to the second frame. A stud receiver is attached to the receiver body. The stud receiver has an outer portion attached to the receiver body so it is substantially non-movable relative to the receiver body. The stud receiver has an inner surface attached to the stud's free end portion and is substantially non-movable relative to the free end portion. The stud receiver is at least partially flexible to allow the stud's free end portion and the stud receiver's inner surface to move as a unit relative to the receiver body when the first frame moves relative to the second frame. In one embodiment, the stud receiver is a polyurethane insert that receives the cylindrical free end portion of the stud.

31 Claims, 5 Drawing Sheets

LOAD-CELL MOUNTING ASSEMBLY

TECHNICAL FIELD

The present invention is directed to load measuring devices, and more particularly, to load-cell assemblies usable for measuring loads on, as an example, a hospital bed or other frame assembly.

BACKGROUND OF THE INVENTION

It is frequently desirable to accurately monitor a patient's weight during the course of a hospital stay. This requires frequent weighing of the patient. However, it is often impractical, if not impossible, to remove patients from a hospital bed to weigh them, particularly on a regular or frequent basis. In order to overcome this difficulty, systems have been designed to weigh patients while they remain in the hospital bed. However, difficulties have been experienced with the accuracy, repeatability, and long-term reliability of existing systems.

Weighing systems have been incorporated into hospital beds, including articulatable hospital beds. Articulatable hospital beds are movable through a wide range of positions as desired by the patient or medical personnel. Movement of the beds exerts various loads and twisting forces on the bed frames. Conventional weighing systems incorporated into hospital beds have experienced difficulty in maintaining accuracy and repeatability because the weighing systems are subjected to significant twisting forces caused by the complex bed construction and the effect of complex movement to certain bed positions. The forces also vary in magnitude depending on the particular configuration of the bed and the position of the patient on the bed. Further, movement of the bed from place to place and frequent change in the bed's positional configuration makes it extremely difficult to maintain highly accurate results for a weighing system on a bed.

Load-cells have been utilized in hospital beds to accurately weigh the patients while on the bed. The load-cells, however, experience difficulties when the articulatable beds move to certain positions that create complex loads and torque forces on the load cells. Conventional load-cells often bind and/or hang up due to the complex movement, thereby resulting in a hysteresis effect, which decreases the accuracy of determining the patient's weight while in bed. Further, the load-cells can bind until excessive force releases the load-cell, thereby causing instant movement of the load-cell, which results in extremely inaccurate weight measurements of the patient. Such binding also increases the chance of damaging the load-cell. Accordingly, extreme difficulties have been incurred in utilizing load-cells with articulatable frames, such as bed frames for weighing patients or other masses on the frame.

SUMMARY OF THE INVENTION

The present invention overcomes drawbacks experienced by the prior art and provides other benefits. One embodiment of the invention provides a load-cell assembly for use with a frame assembly of, as an example, a hospital bed. The frame assembly is adopted to receive a load thereon. The frame assembly has a first frame and a second frame adjacent to the first frame. The first and second frames are movable relative to each other. The load-cell assembly is positionable to interconnect the first and second frames and to measure the load on the first or second frames. The load-cell assembly includes a load-cell body connectable to the first frame and being substantially stationary relative to the first frame. A stud is attached to the load-cell body and has a free end portion extending away from the load-cell body.

A receiver body is connectable to the second frame and is substantially stationary relative to the second frame. A stud receiver is attached to the receiver body. The stud receiver has an outer portion attached to the receiver body and is substantially non-movable relative to the receiver body. The stud receiver has an inner surface attached to the stud's free end portion and is substantially non-movable relative to the stud's free end portion. The stud receiver is at least partially flexible to allow the stud's free end portion and the stud receiver's inner surface to move as a unit relative to the receiver body when the first frame moves relative to the second frame. In one embodiment, the receiver body has a cavity formed therein and the stud receiver is retained in the cavity. In one embodiment, the stud receiver is an elastomeric material, such as polyurethane, having a hardness with a durometer value of approximately 90 Shore A.

In one aspect of the invention, the frame assembly, for example, on an articulatable bed assembly is connected to four load-cell assemblies that interconnect the first and second frames. The load-cell assemblies are positioned to fully suspend the first frame relative to the second frame. The load-cell assemblies are adapted to accurately measure the weight of a patient or other mass on the bed portion independent of the position or configuration of the bed.

DETAILED DESCRIPTION

An articulatable hospital bed 10 having a lower frame assembly 12 and a plurality of load-cell assemblies 14 in accordance with one embodiment of the invention is shown in FIGS. 1–4 and described herein for illustrative purposes. The hospital bed 10 includes a flexible mattress 16 supported on an articulatable upper frame 18. The upper frame 18 is movable between a plurality of positions and is controlled by conventional motors and associated mechanisms. The motors move the upper frame assembly 18 and the mattress 16 through a selected range of motions to provide the positional capability necessary for the hospital bed 10 when a patient is on the mattress. The upper frame assembly 18 is supported on the lower frame assembly 12 by a plurality of load-cell assemblies 14. The load-cell assemblies 14 are configured to measure weight of the patient while on the hospital bed 10 independent of the bed's position or configurations.

Figure 1:
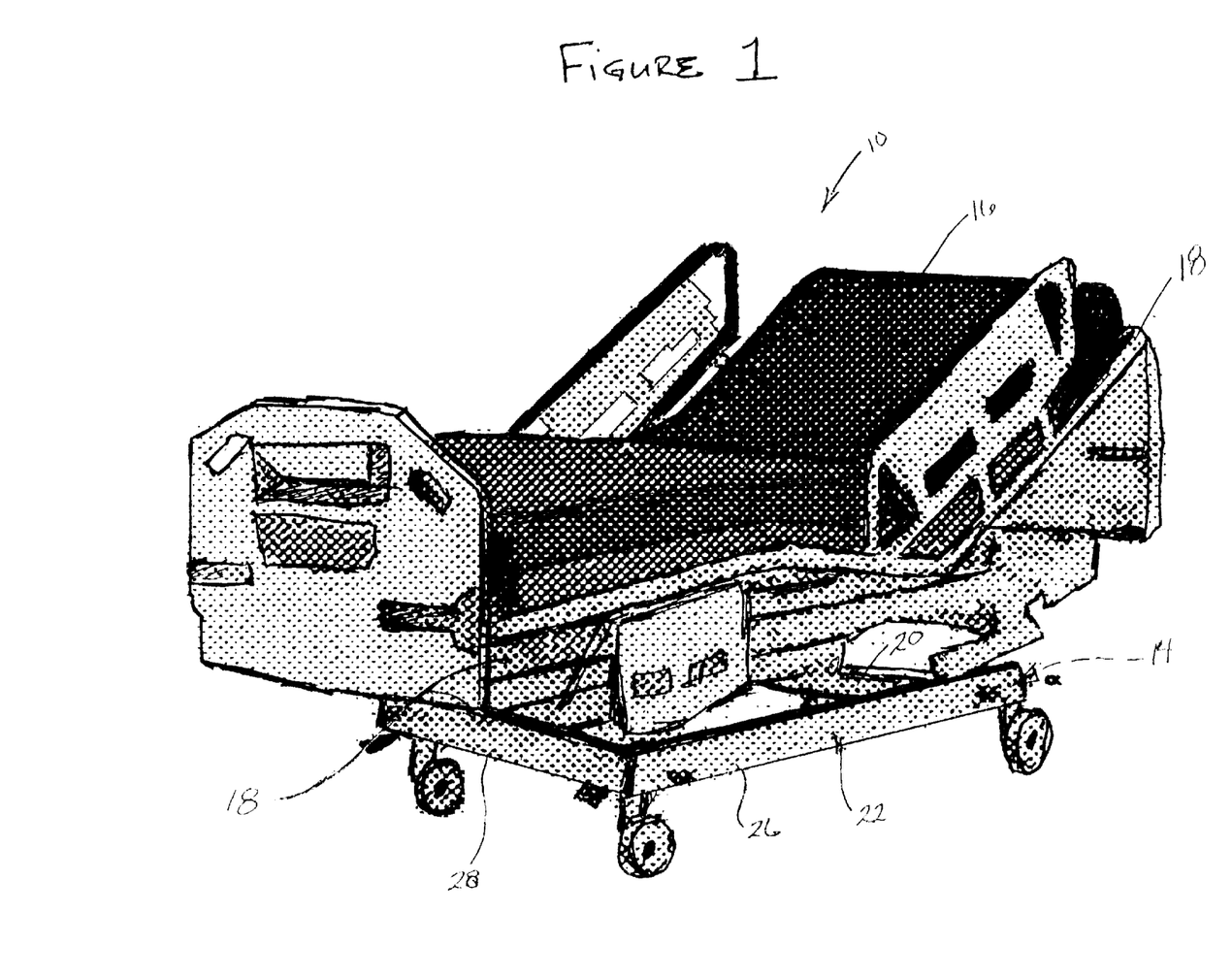
FIG. 1 is an isometric view of a hospital bed with a frame assembly and load-cell assembly in accordance with an embodiment of the present invention.
Figure 2:
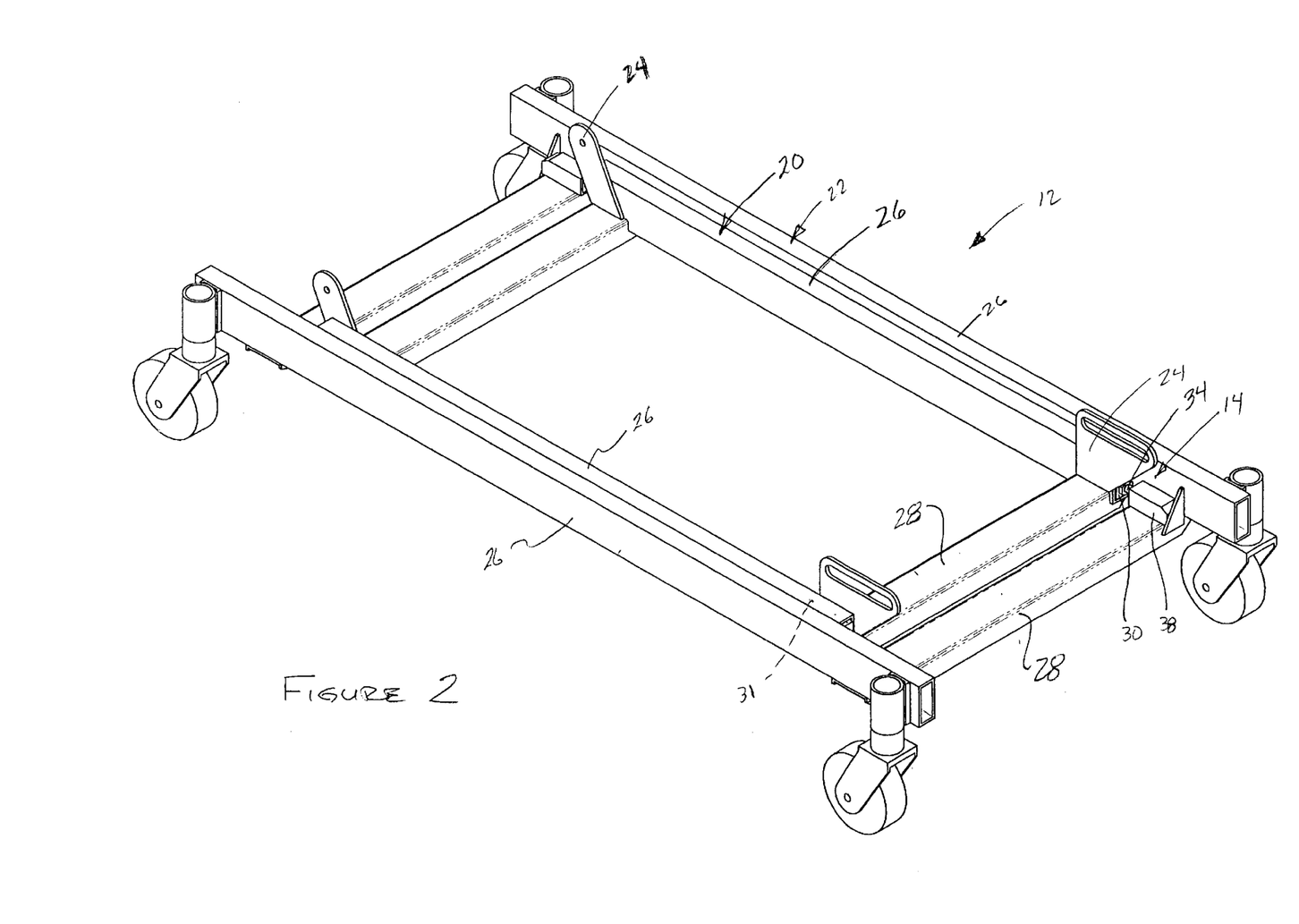
FIG. 2 is an enlarged isometric view of the frame assembly and load-cell assembly of FIG. 1 with the hospital bed portion not shown on the frame for purposes of clarity.

As best seen in FIG. 2, the lower frame assembly 12 includes inner and outer frames 20 and 22. The outer frame 22 is positioned substantially concentrically around the inner frame 20, such that the inner and outer frames are movable relative to each other. The inner frame 20 of the illustrated embodiment is rectangular, and a plurality of mounting flanges 24 are provided at the four corners of the inner frame. The mounting flanges 24 securely connect to the bed's upper frame assembly 18 (FIG. 1) thereby supporting the upper frame assembly, the mattress, the motors and associated mechanisms, and other components coupled to the upper frame assembly.

Each of the inner and outer bed frames 20 and 22 are formed by a pair of spaced-apart, tubular side rails 26 interconnected at their ends by cross rails 28. The inner frame's side rails 26 are parallel and immediately adjacent to the outer frame's side rails. The inner frame's cross rails 28 are parallel and immediately adjacent to the outer frame's cross rails. The inner and outer frames 20 and 22 are interconnected by the load-cell assemblies 14 at the four corner areas of the frames. Accordingly, the inner frame 20 is fully suspended within the perimeter of the outer frame 22 by the load-cell assemblies 14.

Each load-cell assembly 14 is mounted to the inner and outer frames 20 and 22 so as to measure a load exerted on either the inner frame or outer frame. In the illustrated embodiment, primary loads, including the weight of a patient, inner frame, the upper bed frame assembly, the mattress, the motors and associated mechanisms, and other components of the bed are exerted on the inner frame 20. The load-cell assemblies 14 are configured to detect a change in the load, such as when a patient gets on the bed or when the patient's weight changes. Accordingly, the load-cell assemblies are configured to determine the patient's weight without requiring the patient to be moved. The load-cell assemblies 14, as discussed in greater detail below, accurately determine the load on the load-cell assemblies independent of the position of the bed's upper frame assembly 18 and mattress 16.

Figure 3:
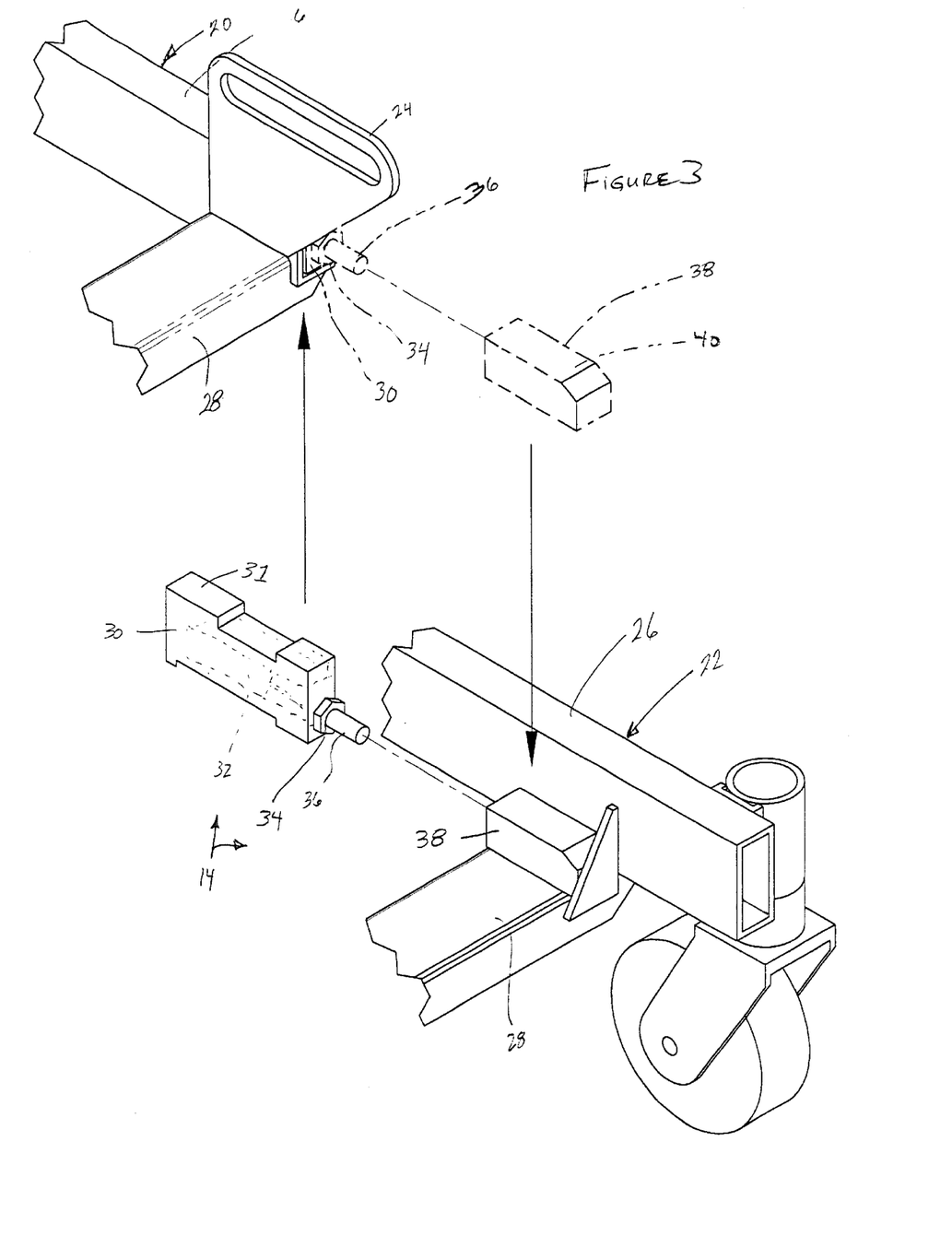
FIG. 3 is an enlarged, partially exploded isometric view of the inner and outer frames and the load-cell assembly of FIG. 2, a load-cell body is shown in phantom lines in the inner frame and a receiver body is shown in phantom lines aligned with the load-cell body.

As best seen in FIG. 2 and 3, the load-cell assembly 14 of the illustrated embodiment includes a load-cell body 30 rigidly connected at a mounting surface 31 to the inner frame 20. The load-cell body 30 is substantially stationary at the mounting surface 31 relative to the inner frame 20 and is movable with the inner frame as a unit relative to the outer frame 22. The load-cell body 30 is a substantially rectangular member contained in an open end of one of the inner frame's tubular side rails 26. The load-cell body 30 is bolted or otherwise secured to the side rail 26, so the end of the load-cell body is positioned at the side rail's open end. The load-cell body 30 contains conventional load or weight detection mechanism 32, such as a strain gauge or the like, coupled to a conventional system for calculating load change.

Figure 4:
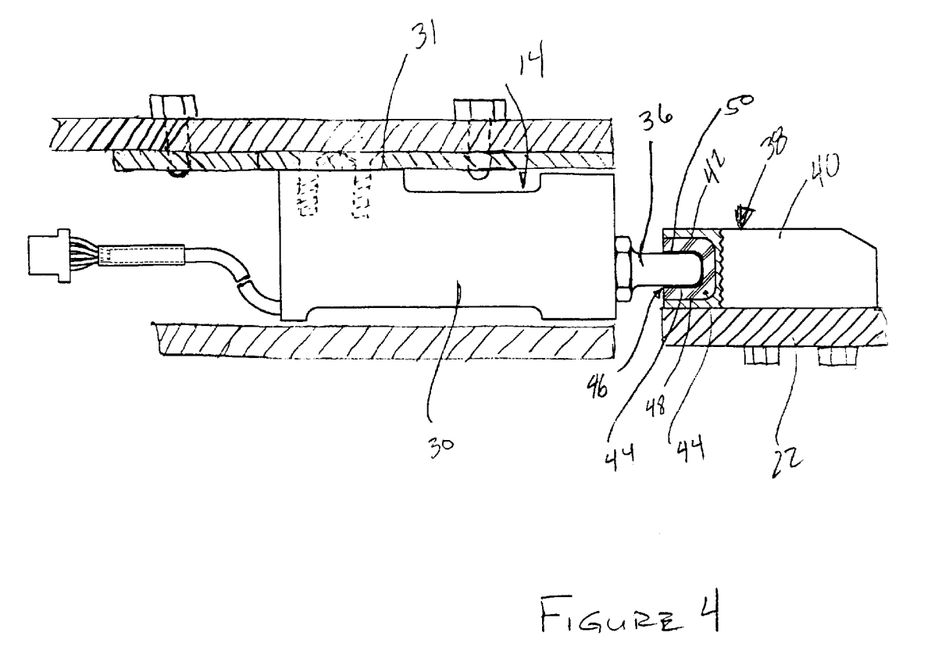
FIG. 4 is an enlarged partial-cutaway side elevation view of the load-cell assembly of FIG. 2.
Figure 5:
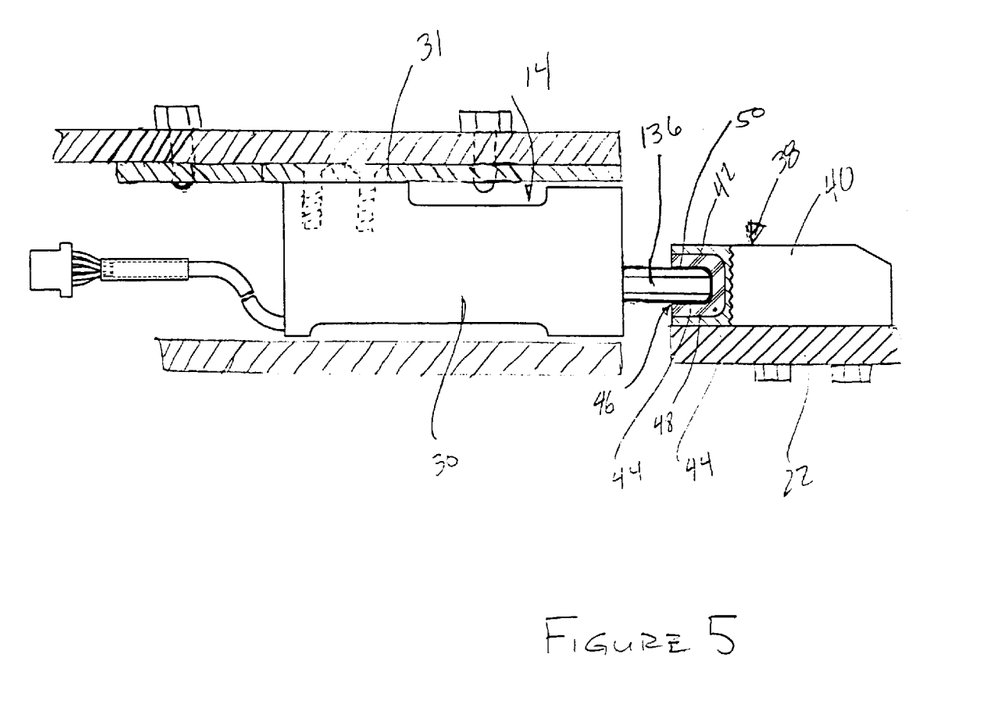
FIG. 5 is an enlarged partial-cutaway side elevation view of an alternate embodiment of the load-cell assembly of FIG. 2.

The load-cell assembly 14 includes a stud 34 connected to the load-cell body 30 and coupled to the load detection mechanism 32. The stud 34 of the illustrated embodiment is threadably connected at one end to the load-cell body 30, and an elongated free end portion 36 projects away from the load-cell body 30. The stud 34 is interconnected to the weight detection mechanism 32 such that a load exerted on the free portion 36 is detected by the load detection mechanism and converted into a load determination. The free end portion 36 of one embodiment is an elongated, non-spherical member. The free end portion 36 illustrated in FIGS. 3 and 4 is a cylindrically shaped member having a substantially uniform cross-sectional area along its length. Other embodiments have a free end portion with substantially uniform cross-sectional area along substantially all of the free end portion's length. FIG. 5 illustrates an alternate embodiment, wherein the stud's free end portion 136 has a polygonal cross-sectional shape, such as a hexagonal cross-sectional shape or the like. Another embodiment provides a stud with a slightly tapered free end portion. Other similar configurations for the free end portion can be used.

The load-cell assembly 14 includes a receiver assembly 38 that receives the stud's free end portion 36. The receiver assembly 38 is securely fastened to the adjacent cross rail 28 of the outer frame 22. As best seen in FIG. 4, the receiver assembly 38 includes a receiver body 40 securely bolted to the outer frame's cross rail 28. The receiver body 40 is stationary relative to the outer frame 22 and movable with the outer frame as a unit relative to the inner frame 20 and the load-cell body 30. The receiver body 40 has receiving socket 42 formed in its end facing the load-cell body 30. The receiving socket 42 is axially aligned with the stud's free end portion 36.

The stud receiving socket 42 contains a flexible, stud-receiving insert 44 having an outer surface 48 adhered or otherwise securely affixed to the surface of the receiver body 40 defining the receiving socket 42. The insert's outer surface 48 engages and is not substantially movable relative to the receiving body 40. The insert 44 also has a receiving aperture 46 defined by an inner surface 50. The receiving aperture 46 is sized to receive the stud's free end portion 36. The receiving aperture 46 is also shaped to substantially correspond to the shape of the stud's free end portion 36. The inner surface 50 engages the stud's cylindrical free end portion 36. In the exemplary embodiment of FIG. 4, the stud's free end portion 36, which is cylindrical, slides into the insert's receiving aperture 46. The weight from the bed's components on inner frame 20 causes the stud to press against the insert 44, thereby creating a substantial frictional engagement between the stud's free end portion 36 and the insert's inside surface 50. In an alternate embodiment, the stud's free end portion 36 can be adhered to or thightly press fit into the insert 44. Accordingly, the insert's inner surface 50 is substantially stationary relative to the stud's free end portion 36 and is movable with the free end portion as a unit relative to the receiving body 40. The stud's free end portion 36 does not slide or slip relative to the insert's inner surface 50 when the inner and outer frames 20 and 22 move relative to each other. Instead, the stud's free end portion 36 and the inner surface of the insert 44 are movable as a unit relative to the receiver body 40 and the outer frame 22.

The insert 44 is made of a selected material, such as an elastomeric material, that is sufficiently flexible or compressible to accommodate for some movement of the stud's free end portion 36 and the insert's inner surface 50 together relative to the receiver body 40. In one embodiment, the movement is provided by deformation of the elastomeric material forming the insert. The insert 44, however, has a sufficient stiffness or hardness to resist movement of the stud's free end portion 36 and to react to the forces exerted thereon by the stud 34 so as to allow for highly accurate load measurements by the load detecting mechanism 32. In one embodiment, the insert 44 is made of polyurethane having a hardness with a durometer value in the range of approximately 75 Shore A to 110 Shore A, inclusive. The preferred hardness of the polyurethane insert for one configuration of the assembly is approximately 90 Shore A. The stud's free end portion 36 with its cylindrical or other selected shape provides an extended outer surface adhered to the insert's inner surface 50 to provide a relatively even load on the elastomeric insert. The stud's configuration avoids point loads on the elastomeric insert 44, thereby reducing the risk of crushing the insert and damaging the load-cell assembly 14 upon application of a very substantial load on the inner or outer frames 20 and 22.

The selected elastomeric insert 44 allows for some movement of the stud's free end portion 36, together with the insert's inner surface 50 relative to the receiver body 40 when a significant load is exerted on the inner frame 20. The stud's free end portion 36, however, does not slide relative to the insert 44 or the receiver body 40, thereby avoiding the hysteresis effect in determining the load or weight exerted on the load-cell assembly 14. Accordingly, the load-cell assembly allows for continual accurate readings of a patient's weight or other load on the bed independent of the movement or position of the bed.

The polyurethane insert 44 in the illustrated embodiment is positioned in the receiving socket 42 by casting the polyurethane either directly into the receiving socket or into a mold of the receiving socket. The stud receiving aperture 46 is formed in the insert during casting or molding. When the polyurethane is cast directly into the receiving socket 42, it is preferred that the selected polyurethane material securely adheres or chemically bonds to the receiver body's surface defining the receiving socket 42 without requiring additional adhesives. When the polyurethane insert 44 is cast into a mold of the receiving socket 43, the insert is removed from the mold and inserted into the receiving socket. The molded insert 44 has a close tolerance fit in the receiving socket 42. The polyurethane material has a coefficient of friction such that the load exerted on the insert 44 by the stud 34 causes a frictional engagement between the insert and the receiver body 40. This frictional engagement retains the insert in the socket and prevents movement of the insert's outer surface 48 relative to the receiver body. In alternate embodiments, the insert 44 can be press fit, glued, snapped into, or otherwise securely retained within the receiving socket 42 so as to prevent movement of the insert's outer surface 48 relative to the receiver body 40.

In another alternate embodiment, the insert can be a different biasing mechanism, such as a stiff spring mechanism or the like, that allows for the relative movement of the stud's cylindrical free end portion 36 relative to the receiver body 40 while preventing movement of the free end portion relative to the biasing mechanism's connection surface. Thus, the motion that occurs between the inner and outer frames 20 and 22 at the mounting portion of the load-cell assembly 14 is accommodated by the biasing mechanism. Accordingly, the accuracy of weight or load measurements by the weight detection mechanism 32 in the load-cell body 30 is greatly increased regardless of the position or normal movement of the articulatable bed.

The embodiments discussed above were discussed relative to hospital bed supported on the frame assemblies. The load-cell assemblies are usable with other configurations utilizing frame assemblies on which loads are exerted and it is desirable to determine those loads. Accordingly, the configuration is not limited to hospital beds and is applicable to other frame configurations, including vehicles, support structures, or other structures the support loads sought to be measured.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to load supporting devices, not necessarily the exemplary hospital bed assembly described above.

These and other changes can be made to the invention in light of the above detailed description. In general, in the following claims, the terms used should not be construed to limit the invention to the specific embodiments disclosed in the specification and claims, but should be construed to include all components that operate in accordance with the claims to provide the claimed assemblies. Accordingly, the invention is not limited by the disclosure, but instead its scope is to be determined entirely by the following claims.

I claim:

1. A bed assembly, comprising
a bed portion adapted to support a selected mass thereon;
a first frame coupled to the bed portion and adapted to support the bed portion and the selected mass;
a second frame adjacent to the first frame and being movable relative to the first frame; and
a load-cell assembly interconnecting the first and second frames, the load-cell assembly being positioned for use in measuring a weight of the selected mass, the load-cell assembly including:
a load-cell body rigidly attached to the first frame and being substantially stationary relative to the first frame;
a stud attached to the load-cell body, the stud having a free end portion projecting away from the load-cell body, the free end portion having a substantially cylindrical shape;
a receiver body rigidly attached to the second frame; and
a stud receiver attached to the receiver body, the stud receiver having an outer portion securely engaging the receiver body and being substantially non-movable relative to the receiver body, the stud receiver having an inner surface securely engaging the stud's cylindrical free end portion, the inner surface being substantially non-movable relative to the stud's cylindrical free end portion, the stud receiver being selectively flexible to allow the stud's cylindrical free end portion and the stud receiver's inner surface to move as a unit relative to the receiver body while the stud receiver's outer portion remains stationary relative to the receiver body when the first frame moves relative to the second frame.

2. The bed assembly of claim 1 wherein the stud receiver is a polyurethane insert attached to the receiver body.

3. The bed assembly of claim 1 wherein the receiver body has a receiving socket therein, and the stud receiver is retained in the receiving socket.

4. The bed assembly of claim 1 wherein the stud receiver is a selected material having a hardness in the range of durometer values of approximately 75 Shore A to 110 Shore A, inclusive.

5. The bed assembly of claim 1 wherein the stud receiver is a selected material having a hardness with a durometer value of approximately 90 Shore A.

6. The bed assembly of claim 1 wherein the load-cell assembly is a first load-cell assembly, and further comprising a second, third, and fourth load-cell assemblies interconnecting the first and second frames and being substantially identical to the first load-cell assembly, the first frame being fully suspended relative to the second frame by the first, second, third, and fourth load-cell assemblies.

7. The bed assembly of claim 1 wherein the first frame is an inner frame, and the second frame is an outer frame substantially concentrically positioned around the inner frame.

8. The bed assembly of claim 1 wherein the bed portion is an articulatable bed portion adapted to support a patient thereon.

9. A weighing bed assembly, comprising:
a bed assembly adapted to support a patient thereon, the bed assembly having a flexible mattress and a support frame movable to a selected one of a plurality of positions;
a first bed frame coupled to the bed assembly and adapted to receive a measurable load thereon;
a second bed frame adjacent to the first bed frame, the second bed frame being movable relative to the first bed frame; and
a load-cell assembly interconnecting the first and second bed frames, the load-cell assembly being positioned to measure the measurable load applied to the first bed frame for determination of a weight of the patient, the load-cell assembly including:
a load-cell body securely connected to the first bed frame, the load-cell body having a load detecting device therein;
a stud attached to the load-cell body and coupled to the load detecting device, the stud having an elongated free end portion extending from the load-cell body;
a receiver body securely connected to the second bed frame; and
a flexible stud receiver connected to the receiver body, the stud receiver having an outer portion attached to the receiver body and being substantially non-movable relative to the receiver body, and having an inner surface defining an elongated receiving aperture, the inner surface being securely engaging to the free end of the stud, the free end of the stud being substantially non-movable relative to the inner surface, and the free end of the stud being movable with the inner surface as a unit relative to the receiving body when the first bed frame moves relative to the second bed frame.

10. The weighing bed assembly of claim 9 wherein the receiver body has a receiving socket therein and the stud receiver is retained in the receiving socket.

11. The bed assembly of claim 9 wherein the stud receiver is an elastomeric material.

12. The bed assembly of claim 9 wherein the stud receiver is a polyurethane material.

13. The bed assembly of claim 9 wherein the stud receiver is a selected material having a hardness in the range of durometer values of approximately 75 Shore A to 110 Shore A, inclusive.

14. The bed assembly of claim 9 wherein the stud receiver is a selected material having a hardness with a durometer value of approximately 90 Shore A.

15. The bed assembly of claim 9 wherein the load-cell assembly is a first load-cell assembly, and further comprising a second, third, and fourth load-cell assemblies interconnecting the first and second frames and being substantially identical to the first load-cell assembly, the first bed frame being fully suspended relative to the second bed frame by the first, second, third, and fourth load-cell assemblies.

16. A frame assembly, comprising:
a first frame adapted to receive a load thereon;
a second frame adjacent to the first frame and being movable relative to the first frame; and
a load-cell assembly interconnecting the first and second bed frames, the load-cell assembly being positioned to measure the load, the load-cell assembly including:
a load-cell body connected to the first frame and being substantially stationary relative to the first frame;
a stud attached to the load-cell body, the stud having a free end portion projecting away from the load-cell body, the free end portion having a substantially cylindrical shape;
a receiver body connected to the second frame and being substantially stationary relative to the second frame; and
stud receiver attached to the receiver body, the stud receiver having an outer portion attached to the receiver body and being substantially non-movable relative to the receiver body, the stud receiver having an inner surface attached to the stud's free end portion and being substantially non-movable relative to the stud's free end portion, the stud receiver being selectively flexible to allow the stud's free end portion and the stud receiver's inner surface to move as a unit relative to the receiver body when the first frame moves relative to the second frame.

17. A load-cell assembly useable with a frame assembly that supports a selected mass thereon, the frame assembly having first and second frames movable relative to each other, comprising:
a load-cell body attachable to the first frame and substantially stationary relative to the first frame;
a stud attached to the load-cell body, the stud having a free end portion extending away from the load-cell body;
a receiver body attachable to the second frame and being substantially stationary relative to the second frame; and
a stud receiver attached to the receiver body, the stud receiver having an outer portion attached to the receiver body and being substantially non-movable relative to the receiver body, the stud receiver having an inner surface attached to the stud's free end portion and being substantially non-movable relative to the stud's free end portion, the stud receiver being at least partially flexible to allow the stud's free end portion and the stud receiver's inner surface to move as a unit relative to the receiver body when the first frame moves relative to the second frame.

18. The load-cell assembly of claim 17 wherein the receiver body has a receiving socket therein and the stud receiver is retained in the receiving socket.

19. The load-cell assembly of claim 18 wherein the stud receiver is a polyurethane insert.

20. The load-cell assembly of claim 17 wherein the stud receiver is an elastomeric material.

21. The load-cell assembly of claim 17 wherein the stud receiver is a selected material having a hardness with a durometer value of approximately 75 Shore A to 110 Shore A, inclusive.

22. The load-cell assembly of claim 17 wherein the stud receiver is a selected material having a hardness with a durometer value of approximately 90 Shore A.

23. The load-cell assembly of claim 17 wherein the stud's free end portion is frictionally retained in the stud receiver.

24. The load-cell assembly of claim 17 wherein the stud receiver is frictionally retained in the receiver body.

25. The load-cell assembly of claim 17 wherein the stud's free end portion is substantially cylindrical.

26. The load-cell assembly of claim 17 wherein the stud's free end portion is an elongate member having a substantially uniform cross-sectional area along its length.

27. The load-cell assembly of claim 17 wherein the stud's free end portion is substantially non-spherical.

28. The load-cell assembly of claim 17 wherein the stud's free end portion is an elongate member having a substantially polygonal cross-sectional area along its length.

29. A bed assembly, comprising:
a bed portion adapted to support a selected mass thereon;

a first frame coupled to the bed portion and adapted to support the bed portion and the selected mass;

a second frame adjacent to the first frame and being movable relative to the first frame; and a load-cell assembly interconnecting the first and second frames, the load-cell assembly being positioned for use in measuring a weight of the selected mass, the load-cell assembly including:

a load-cell body rigidly attached to one of the first and second frames and being substantially stationary relative to one of the first and second frames;

a stud attached to the load-cell body, the stud having a free end portion projecting away from the load-cell body, the free end portion having a substantially cylindrical shape along its length;

a receiver body rigidly attached to the other one of the first and second frames; and a stud receiver attached to the receiver body, the stud receiver having an outer portion securely engaging the receiver body and being substantially non-movable relative to the receiver body, the stud receiver having an inner surface securely engaging the stud's cylindrical free end portion, the inner surface being substantially non-movable relative to the stud's cylindrical free end portion, the stud receiver being selectively flexible to allow the stud's cylindrical free end portion and the stud receiver's inner surface to move as a unit relative to the receiver body while the stud receiver's outer portion remains stationary relative to the receiver body when one frame moves relative to the other frame.

30. The bed assembly of claim 29 wherein the stud's free end portion is oriented generally horizontally.

31. A weighing bed assembly, comprising:

a bed assembly adapted to support a patient thereon, the bed assembly having a support frame movable to a selected one of a plurality of positions;

a first bed frame coupled to the bed assembly and adapted to receive a measurable load thereon;

a second bed frame adjacent to the first bed frame, the second bed frame being movable relative to the first bed frame; and a load-cell assembly interconnecting the first and second bed frames, the load-cell assembly being positioned to measure the measurable load applied to the first bed frame for determination of a weight of the patient, the load-cell assembly including:

a load-cell body securely connected to the first bed frame, the load-cell body having a load detecting device therein;

a stud attached to the load-cell body and coupled to the load detecting device, the stud having an elongated free end portion extending from the load-cell body, the elongated free end portion having a substantially similar cross section, the elongated free portion being oriented generally horizontally;

a receiver body securely connected to the second bed frame; and a flexible stud receiver connected to the receiver body, the stud receiver having an outer portion attached to the receiver body and being substantially non-movable relative to the receiver body, and having an inner surface defining a horizontally oriented, elongated receiving closed-end hole, the inner surface securely engaging the horizontally-oriented free end of the stud, the free end of the stud being substantially non-movable relative to the inner surface, and the free end of the stud being movable with the inner surface as a unit relative to the receiving body when the first bed frame moves relative to the second bed frame.

* * * * *

UNITED STATES PATENT AND TRADEMARK OFFICE
CERTIFICATE OF CORRECTION

PATENT NO. : 6,362,439 B1
DATED : March 26, 2002
INVENTOR(S) : Reichow

It is certified that error appears in the above-identified patent and that said Letters Patent is hereby corrected as shown below:

Column 3,
Line 5, "comers" should be -- corners --;
Line 19, "comer" should be -- corner --;

Column 6,
Line 11, insert colon after "comprising";.

Signed and Sealed this

Nineteenth Day of November, 2002

*Attest:*

*Attesting Officer*

JAMES E. ROGAN
*Director of the United States Patent and Trademark Office*